United States Patent [19]

Boskovic

[11] 4,384,702

[45] May 24, 1983

[54] MOLD INSERT

[76] Inventor: Boris Boskovic, 2102 Bannockburn, Inverness, Ill. 60067

[21] Appl. No.: 356,490

[22] Filed: Mar. 9, 1982

[51] Int. Cl.³ .......................... B29C 1/00; B29F 1/00
[52] U.S. Cl. .................................. 249/103; 425/190; 425/195
[58] Field of Search ............... 249/102, 103, 104, 140; 425/182, 183, 186, 193, 190, 195, 28 R, 28 D, 812, 44

[56] References Cited

U.S. PATENT DOCUMENTS

| | | | |
|---|---|---|---|
| 180,450 | 8/1876 | Beck | 249/103 |
| 490,966 | 1/1893 | Irwin | 249/103 |
| 992,830 | 5/1911 | Wheaton | 249/103 |
| 1,576,212 | 3/1926 | O'Neill | 249/103 |
| 2,296,016 | 9/1942 | Bostwick | 425/28 D |
| 2,679,663 | 6/1954 | Schwemler et al. | 425/28 D |
| 3,160,928 | 12/1964 | Senillie | 425/812 |
| 3,230,590 | 1/1966 | Schaible et al. | 425/812 |
| 3,262,404 | 7/1966 | Morg et al. | 425/183 |
| 3,344,477 | 11/1967 | Stokis | 425/812 |
| 3,518,335 | 6/1970 | Jablonski | 425/44 X |
| 3,581,374 | 6/1971 | Geary | 249/104 X |
| 4,254,933 | 3/1981 | Netto | 249/103 |

Primary Examiner—J. Howard Flint, Jr.
Attorney, Agent, or Firm—Lee, Smith & Jager

[57] ABSTRACT

A removable insert for a mold for impressing indicia on each molded product formed in the mold. The insert includes a plug body, a bore through the plug body, and a plug situated in the bore and having a mold engaging surface for impressing an article formed in the mold. The plug is rotatable and include an indicator which may be directed toward a series of indicia spaced about the periphery of the bore.

10 Claims, 10 Drawing Figures

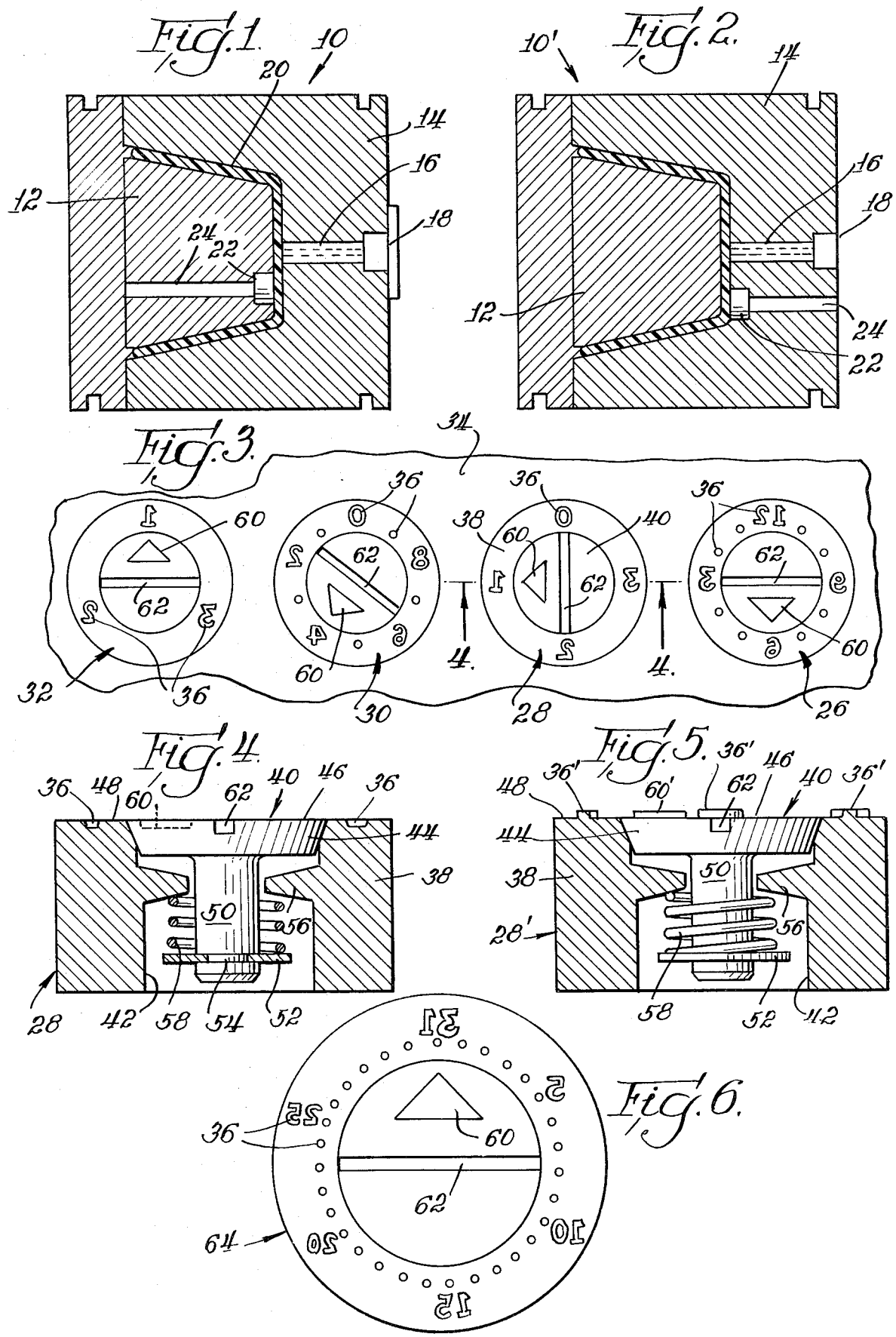

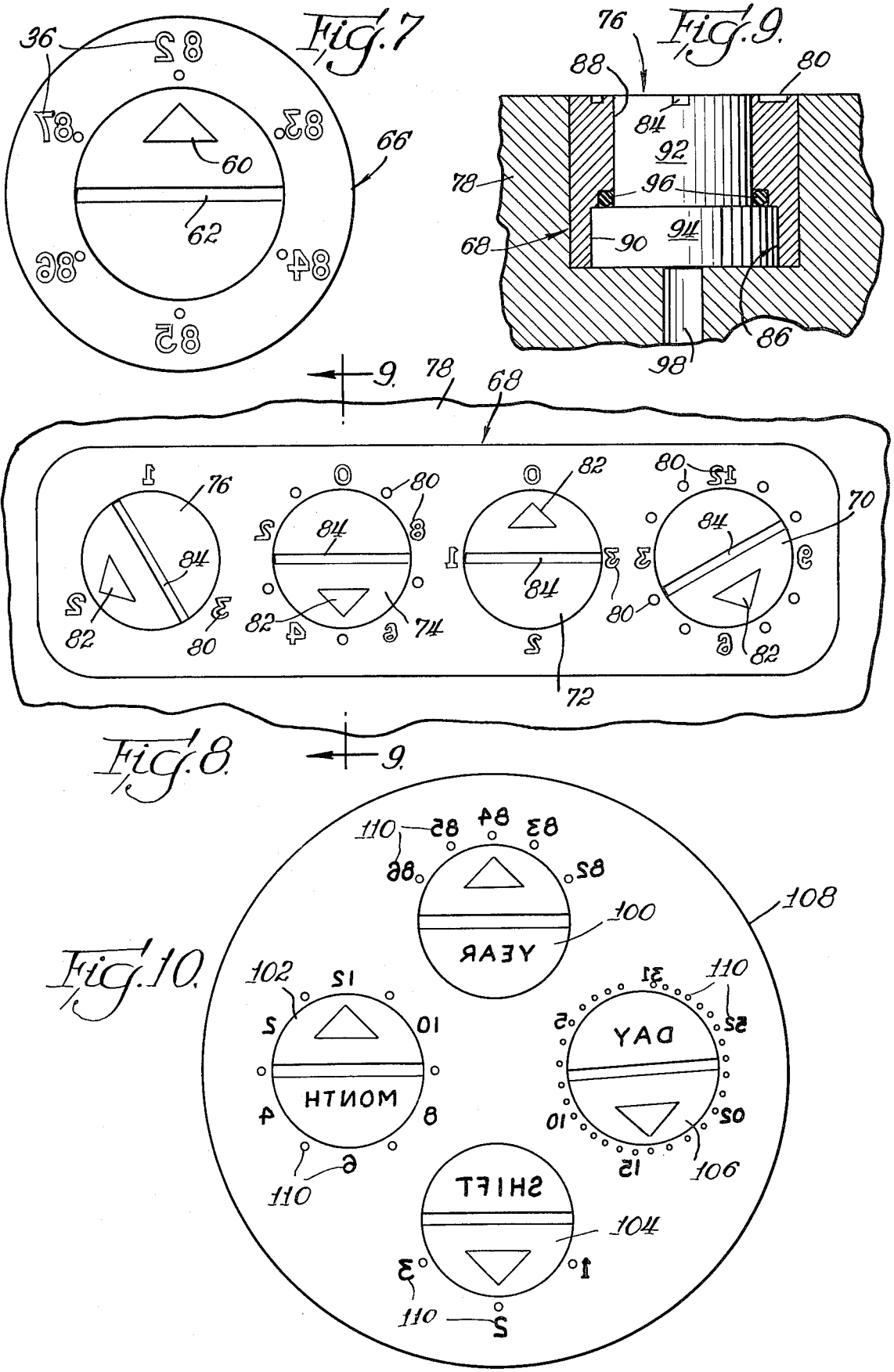

MOLD INSERT

BACKGROUND OF THE INVENTION

This invention relates to injection molding of plastic materials, and in particular to a removable insert for a mold for impressing indicia on each molded product formed in the mold.

As injection molding of plastic materials becomes more prevelant, for the purposes of quality control or identification, it is often desirable to have identifying indicia added to the molded product to identify the date that the product is made or, in some situations, even the shift during the day that the product is formed. While the mold interior can be accommodated with such information, if a part of the mold is engraved or embossed with such indicia, the mold part must constantly be changed on a daily or other regular basis so that the impressed indicia is kept up-to-date. Replacing mold parts, however, can prove to be quite costly.

SUMMARY OF THE INVENTION

The present invention is directed to a removable insert for a mold for impressing indicia on each molded product formed in the mold that which need not be removed or replaced for changing the identification of the indicia impressed. The insert includes a plug body having face shaped to form a working part of a mold when the insert is installed in a mold. At least one bore is formed in the plug body through the face. A plug is situated in the bore and has one end contiguous with the face, the one end substantially filling the bore at the face and having a mold engaging surface contoured to conform to the adjacent contours of the face. A series of indicia is included on the face spaced about the bore and an indicia selection indicator is located on the mold engaging surface of the plug. The plug is rotatable about its axis to direct the indicator toward one of the indicia.

In one form of the invention, the plug includes a shank extending into the bore. For mounting the plug within the bore, the bore includes a shoulder surrounding the shank toward the end of the plug adjacent the face of the plug body. The other end of the plug has a retaining ring fitted into a groove in the shank and a spring under compression is located between the shank and the retaining ring for holding the plug securely within the bore.

In another form of the invention, the bore includes a first bore portion of a first cross-sectional dimension commencing at the face of the plug body and a second bore portion of a second cross-sectional dimension, larger than the first cross-sectional dimension, extending from the first bore portion. The plug includes a first segment occupying the first bore portion and a second segment occupying the second bore portion. The combination of the larger second bore portion and the second segment irremovably mounts the plug within the plug body.

The indicia can be either embossed or engraved in the face of the plug body about the bore. Similarly, the indicator can be either embossed or engraved on the mold engaging surface of the plug.

In one form of the invention, a separate plug body is provided for each plug. In another form of the invention, a plurality of bores are provided in the plug body to accommodate a series of plugs, the bores either being spaced from one another and arranged in series, or being spaced from another and arranged in a circular configuration. In all embodiments, in order to facilitate rotating of the plug to point the indicator towards the desired indicia, each plug includes a slot in the mold engaging surface which is shaped to accommodate a screwdriver blade. A screwdriver may therefore be employed to rotate each plug to identify the indicia being impressed on the molded product.

BRIEF DESCRIPTION OF THE DRAWINGS

The invention is described in greater detail in the following description of the preferred embodiments, taken in conjunction with the drawings, in which:

FIG. 1 is a cross-sectional illustration of a mold having the insert according to the invention located in the male part of the mold, FIG. 2 is a cross-sectional illustration of a mold similar to that of FIG. 1 but including the insert according to the invention located in the female part of the mold, FIG. 3 is an enlarged top plan view of a series of inserts according to the invention installed within a mold, FIG. 4 is an enlarged cross-sectional illustration taken along lines 4—4 of FIG. 3, FIG. 5 is an enlarged cross-sectional illustration similar to FIG. 4 but in which the indicia and indicator are embossed rather than engraved, FIG. 6 is a plan view of an insert according to the invention having indicia for showing the days of the month, FIG. 7 is a view similar to FIG. 6 but showing indicia relating to the year date, FIG. 8 is a top plan illustration of an insert having a series of plugs bearing various indicia, FIG. 9 is a cross-sectional illustration taken along lines 9—9 of FIG. 8 showing an alternative form of the insert according to the invention, and FIG. 10 is another embodiment of the invention having a circular insert with a series of plugs spaced from one another and arranged in a circular configuration.

DESCRIPTION OF THE PREFERRED EMBODIMENTS

A mold incorporating a removable insert according to the invention is shown generally at 10 in FIG. 1. The mold 10 includes a mold core or male part 12, a mold cavity or female part 14, and a mold inlet 16 having a gate 18 through which plastic material to be formed within the mold 10 is injected. A molded part is shown generally at 20 in FIG. 1.

An insert 22 according to the invention is located within an aperture formed in the mold core 12. The insert 22 is pressure fitted within the aperture in the mold core so that the insert 22 is held securely in place. A bore 24 leads from the insert 22 within the mold core 12 so that the insert 22 can be removed, if required, by passing a long tool through the bore 24 to tap the insert 22 from the mold core 12.

FIG. 2 illustrates a mold 10' similar to that of FIG. 1. However, in this embodiment of the invention, the insert 22 is located in the mold cavity 14. Otherwise, the mold 10' is identical to the mold 10 of FIG. 1.

FIG. 3 illustrates a series of inserts 26, 28, 30 and 32 installed within a mold body 34. Each of the inserts 26 through 32 includes a series of indicia 36. The inserts 26 through 32 and indicia 36 are reversed so that impressions on a molded article are easily readable. Other than the indicia 36, each of the inserts 26 through 32 is identical and therefore only the insert 28, illustrated in enlarged cross-section in FIG. 4, will be discussed in detail, it being understood that the description of the insert 28 is equally applicable to the inserts 26, 30 and 32.

The insert 28 includes two primary portions, a plug body 38 and a plug 40. The plug body 38 includes a central bore 42 in which the plug 40 is installed. One end of the plug 40, designated 44, includes a mold engaging surface 46. The plug end 40 fills the bore 42 to the extent of the plug end 44, as shown.

The mold engaging surface 46 is contiguous with the face 48 of the plug body 38. The surface 46 is contoured to conform to the adjacent contours of the face 48 and, in the form of the invention shown in FIG. 4, the face 48 and surface 46 are flat. Depending on the mold 10 in which the insert 28 is installed, however, the face 48 and surface 46 might be curved or otherwise shaped to conform to the molded part being formed.

A shank 50 extends from the plug end 44. A retention ring 52 is installed in a groove 54 formed about the shank 50 at its distal end. The bore 42 includes an annular shoulder 56 extending into the bore as shown, and a spring 58, under compression, is located between the shoulder 56 and retention ring 52. In cooperation with the plug end 44, the spring 58, bearing between the shoulder 56 and retention ring 52, maintains the plug 40 securely in place within the bore 42 of the insert 28.

As shown in FIGS. 3 and 4, each of the inserts 26 through 32 includes an indicator 60 for selecting certain of the indicia 36. As shown in FIG. 3, each indicator 60 may be pointed toward a certain one of the indicia 36 of each of the inserts 26 through 32.

As shown in FIG. 4, the indicator 60 of the plug 40 is engraved into the mold engaging surface 46. In order to facilitate rotation of the plug 40 to aim the indicator 60 at a different one of the indicia 36, the plug end 44 includes a transverse slot 62 extending across the mold engaging surface 46. The slot 62 is shaped to accommodate the blade of a screwdriver to permit the user to rotate the plug 40 as desired.

The embodiment of the invention shown in FIG. 5 is substantially identical to that shown in FIG. 4 with the exception that the indicia 36' and indicator 60' are embossed rather than engraved. With this exception, the insert 28' of FIG. 5 is identical to that of FIG. 4 and the description thereof is therefore not repeated.

FIGS. 6 and 7 illustrate, respectively, an insert 64 for showing the days of a single month and an insert 66 for indicating one of six successive years. The structures of the inserts 64 and 66 are identical to those of either FIG. 4 or 5. Corresponding reference numerals are therefore repeated in FIGS. 6 and 7.

FIG. 8 illustrates another embodiment of the invention in which a single insert 68 includes four individual plugs 70, 72, 74 and 76. The insert 68 is shown installed in a portion of a mold 78. The insert 68 includes a series of indicia 80 about each of the plugs 70 through 76, and each plug 70 through 76 carries an indicator 72 and a slot 84 to facilitate rotation of the plug.

FIG. 9 is a cross-sectional view of the insert 68 taken through the plug 76. As shown, the plug 76 is installed in the bore 86 in the insert 68, the bore comprising a first bore portion 88 and a larger diameter, second bore portion 90. The plug 76 correspondingly includes a first segment 92 occupying the first bore portion 88 and a larger diameter, second segment 94 occupying the second bore portion 90. Since the segment 94 is of a greater dimension than the bore portion 88, the plug 76 is maintained securely within the insert 68, bearing against the mold 78.

A sealing ring 96 is employed at the juncture of the bore portions 88 and 90 to effect a good seal about the plug 76 and avoid a seepage of plastic material into a bore 98. The bore 98 is similar to the bore 24 (FIGS. 1 and 2) and is used when necessary for removal of the insert 68 from the mold 78.

FIG. 10 illustrates another embodiment of the invention in which four plugs 100, 102, 104 and 106 are installed in a mold insert 108. The insert 108 carries a series of indicia 110 about each of the plugs 100 through 106 and the structure of the plugs (and corresponding bores within which the plugs 100 through 106 are located) may correspond to any of the embodiments discussed above. The plugs 100 through 106 are spaced from one another and are arranged in a circular configuration in the insert 108, the insert 108 therefore being amendable to insulation within a circular bore formed in a mold (not illustrated). Although the four plugs 100 through 106 and corresponding indicia 110 are shown to represent shift, day, year and month, it should be apparent that a fewer or greater number of plugs can be employed, and the representative indicia changed depending on the use invisioned for the insert 108.

Various changes may be made to the invention without departing from the spirit thereof or scope of the following claims.

What is claimed is:

1. A removable insert for a mold for impressing indicia on each molded product formed in the mold, comprising
   a. a plug body, said plug body having a face shaped to form a working part of a mold when said insert is installed in a mold,
   b. at least one bore in said plug body through said face,
   c. a plug situated in each said bore, said plug having one end contiguous with said face, said one end substantially filling said bore and having a mold engaging surface contoured to conform to the adjacent contours of said face,
   d. means mounting said plug in said bore with said surface contiguous with said face,
   e. a series of indicia in said face about said bore,
   f. an indicia selection indicator on said surface, and
   g. means for rotating said plug about its axis to direct said indicator toward one of said indicia.

2. An insert according to claim 1 in which said plug includes a shank extending into said bore from said one end, and said mounting means includes a shoulder in said bore surrounding said shank adjacent said one end, the other end of said plug having a stop on said shank and including a spring under compression about said shank and extending between said shoulder and said stop.

3. An insert according to claim 2 in which said stop comprises a retaining ring in a groove in said shank.

4. An insert according to claim 1 in which said bore includes a first bore portion of a first cross-sectional dimension commencing at said face and a second bore portion of a second cross-sectional dimension extending from said first bore portion, said second cross-sectional dimension being greater then said first, and said plug includes a first segment occupying said first bore portion and a second segment occupying said second bore portion.

5. An insert according to claim 4 in which said second segment and said second bore portion constitute said mounting means.

6. An insert according to claim 1 in which said indicia is embossed on said face and said indicator is embossed on said surface.

7. An insert according to claim 1 in which said indicia is engraved in said face and said indicator is engraved in said surface.

8. An insert according to claim 1 including a plurality of said bores in said plug body, said bores being spaced from one another and arranged in series.

9. An insert according to claim 1 including a plurality of said bores in said plug body, said bores being spaced from one another and arranged in a circular configuration.

10. An insert according to claim 1 in which said rotating means comprises a slot in said surface shaped to accommodate a screwdriver blade.

* * * * *